(12) United States Patent
Kauppinen et al.

(10) Patent No.: US 7,925,762 B1
(45) Date of Patent: Apr. 12, 2011

(54) ROAMING SUPPORT METHOD AND SYSTEMS IN UMTS

(75) Inventors: Risto Kauppinen, Helsinki (FI); Heikki Tuunanen, Espoo (FI)

(73) Assignee: Nokia Corporation, Espoo (FI)

( * ) Notice: Subject to any disclaimer, the term of this patent is extended or adjusted under 35 U.S.C. 154(b) by 1677 days.

(21) Appl. No.: 10/343,707

(22) PCT Filed: Aug. 10, 2000

(86) PCT No.: PCT/EP00/07779
§ 371 (c)(1),
(2), (4) Date: Aug. 22, 2003

(87) PCT Pub. No.: WO02/13567
PCT Pub. Date: Feb. 14, 2002

(51) Int. Cl.
*G06F 15/16* (2006.01)

(52) U.S. Cl. ........ 709/227; 709/203; 709/218; 709/220; 709/237; 709/238; 709/249; 455/432.1; 370/328

(58) Field of Classification Search ................... 709/227, 709/228, 238, 249, 203, 218, 220, 237; 455/432.1, 455/436; 370/328
See application file for complete search history.

(56) References Cited

U.S. PATENT DOCUMENTS

| | | | | |
|---|---|---|---|---|
| 5,579,379 A * | 11/1996 | D'Amico et al. | ........ | 379/114.01 |
| 6,160,804 A * | 12/2000 | Ahmed et al. | ................. | 370/349 |
| 6,230,012 B1 * | 5/2001 | Willkie et al. | ............. | 455/435.1 |
| 6,256,300 B1 * | 7/2001 | Ahmed et al. | ................. | 370/331 |
| 6,317,594 B1 * | 11/2001 | Gossman et al. | ........... | 455/414.1 |
| 6,393,482 B1 * | 5/2002 | Rai et al. | ........................ | 709/225 |
| 6,414,950 B1 * | 7/2002 | Rai et al. | ........................ | 370/338 |
| 6,490,259 B1 * | 12/2002 | Agrawal et al. | ................ | 370/331 |
| 6,515,974 B1 * | 2/2003 | Inoue et al. | ..................... | 370/331 |
| 6,615,037 B1 * | 9/2003 | Bharatia et al. | ................ | 455/417 |
| 6,628,943 B1 * | 9/2003 | Agrawal et al. | ............ | 455/432.1 |
| 6,651,105 B1 * | 11/2003 | Bhagwat et al. | ............... | 709/239 |
| 6,654,359 B1 * | 11/2003 | La Porta et al. | ................ | 370/328 |
| 6,654,606 B1 * | 11/2003 | Foti et al. | .................... | 455/432.1 |
| 6,707,813 B1 * | 3/2004 | Hasan et al. | ................... | 370/356 |
| 6,708,031 B2 * | 3/2004 | Purnadi et al. | ................. | 455/436 |
| 6,721,565 B1 * | 4/2004 | Ejzak et al. | .................... | 455/436 |

(Continued)

FOREIGN PATENT DOCUMENTS

WO      WO 99/12104     3/1999

OTHER PUBLICATIONS

Handley et al., "SIP: Session Initiation Protocol", RFC 2543, Internet RFC/STD/FYI/BCP Archives, Network Working Group, Mar. 1999.

(Continued)

*Primary Examiner* — Michael Won
(74) *Attorney, Agent, or Firm* — Mintz, Levin, Cohn, Ferris, Glovsky and Popeo, P.C.

(57) ABSTRACT

The invention relates to a communication method and system wherein a network element of a roaming user is attachable to a visited first network and be served by a serving means of the home network. When the network element of the roaming user is registering or initiating a connection to a called network element of the visited network, a network element of the visited network, such as proxy means, either adds information on the called network element or on a service element of the visited network when sending a message to the home network. The message is preferably sent as a protocol message, in particular a message of the Session Initiation Protocol.

33 Claims, 3 Drawing Sheets

U.S. PATENT DOCUMENTS

| | | | | |
|---|---|---|---|---|
| 6,751,204 B1 * | 6/2004 | Foti et al. | | 370/328 |
| 6,763,233 B2 * | 7/2004 | Bharatia | | 455/433 |
| 6,775,253 B1 * | 8/2004 | Agrawal et al. | | 370/329 |
| 6,888,803 B1 * | 5/2005 | Gentry et al. | | 370/259 |
| 7,085,260 B2 * | 8/2006 | Karaul et al. | | 370/352 |
| 7,120,453 B2 * | 10/2006 | La Porta et al. | | 455/458 |
| 7,184,418 B1 * | 2/2007 | Baba et al. | | 370/331 |
| 7,441,032 B2 * | 10/2008 | Costa Requena | | 709/225 |
| 7,475,140 B2 * | 1/2009 | Costa Requena | | 709/225 |
| 2002/0068565 A1 * | 6/2002 | Purnadi et al. | | 455/436 |
| 2006/0294244 A1 * | 12/2006 | Naqvi et al. | | 709/227 |

OTHER PUBLICATIONS

3GPP TSG SAWG2#11, Puerto Vallarta, Mexico, Jan. 24-28, 1999, Release 2000 Architecture.

3GPP, ETSI TS 123 002 V3.3.0 (Mar. 2000), Technical Specification, Digital Cellular Telecommunications System (Phase 2+) (GSM);Universal Mobile Telecommunications System (UMTS); Network architecture (3G TS 23.002 version 3.3.0 Release 1999).

* cited by examiner

ROAMING SUPPORT METHOD AND SYSTEMS IN UMTS

BACKGROUND OF THE INVENTION

1. Field of the Invention

The invention relates to the field of mobile communication. In particular, the invention addresses the handling of connections or connection-related parameters when a connection involves two or more networks.

2. Description of the Prior Art

In recent or planned network architectures, different service models for roaming subscribers may be provided. When a user is roaming, the control means or control function (such as the Serving-CSCF "Call State Control Function" in a network architecture according to Release 2000) to which a subscriber is registered and where the connection control such as the call state control is handled, may still be located in the home network. In such a home service model, it is important to pass different kinds of information from the visited network to the home network for proper connection control.

When, for instance, the serving control function does not have all necessary information, on service class or charging rate, etc., the control function may improperly handle or charge a connection such as a call from a roaming subscriber to another equipment or user.

SUMMARY OF THE INVENTION

The invention provides a system and a method which enable an appropriate handling or processing of a connection such as a call even when a subscriber should be attached to a visited network.

In accordance with an aspect of the invention, a communication system is provided.

According to a further aspect of the invention, a method is provided.

In more detail, the invention is directed to a communication method and/or communication system comprising at least one first network element attachable to a visited first network and connectable to a second network element of the visited first network, the second network element being able to access a third network element located in a second network. The first network element sends a first message to the second network element for registering to the first network or connecting to the third network element or a fourth network element of the visited first network. The second network element sends a second message to the third network element, the second message containing additional information either related to the handling or processing of a connection from the first network element to the fourth network element, or related to an address of, or identifier identifying, a further network element of the first network which contains, or has access to, a database comprising information related to the handling or processing of a connection to the fourth network element. The third network element uses this additional information for handling the connection or processing of one or more connection-related functions, or for accessing the further network element, or for storing the additional information and providing thereof upon request. The message is preferably transmitted as a protocol message, in particular of the Session Initiation Protocol (SIP).

The invention generally provides for the transfer of service information and/or other information from a visited network to a home network, preferably when a home service model where the call control such as call state control is handled in the home network. In accordance with a preferred aspect of the invention, the visited network provides a proxy function, such as a proxy call state control function (CSCF), which passes information to the home network, preferably to a serving control means or function such as serving CSCF, or to a subscriber serving function or means such as HSS (Home Subscriber Server).

In accordance with a preferred aspect of the invention, problems related to properly handling or processing connections of a roaming subscriber are solved. As an example, the invention allows an appropriate charging or other call control when a roaming subscriber calls to a destination in the visited network, e.g. to a local PSTN (Public Switched Telephone Network). As the home network normally does not know detail level information on local numbers and/or logical names and/or aliases used in the visited network, the control means or function such as the proxy function (for example a proxy CSCF) in the visited network is, in accordance with one embodiment of the invention, adapted to adds information about the called local destination. As an example, the added information can indicate the charging rate and type of destination. The proxy server or function can add this information for example on a call-basis when the visiting subscriber calls to a local destination of the visited network via the proxy server.

In accordance with another embodiment of the invention, the proxy server or function can add a pointer pointing to a local service or service element of the visited network from which the serving control function of the home network can ask information on the destination (for example charging rate, type of destination, etc.).

Instead of adding such a pointer on a call-basis, i.e. adding it to each call notification, a pointer pointing to a local service element having relevant information on the destinations in the visited network may also be passed at the registration phase.

The structure and method according to the invention also offer the possibility of performing other services such as call barring in the home network based on the information received from the visited network. When for example the call control function or means of the home network has received call barring information input for example by a user or company and defining, for instance, the barring of outgoing international calls, the call control function or means of the home network will request the visited network control function or means (for example proxy server of the visited network) not to establish a connection when the roaming subscriber requests the call control function or means of the visited network to initiate a connection to an international call (the call control function or means of the visited network reports on such a request to the serving control function of the home network before establishing such a call).

Preferably, signalling information (messages) transmitted is secured and authenticated between different networks.

DETAILED DESCRIPTION OF

Preferred Embodiments of the Invention

Figure 1:
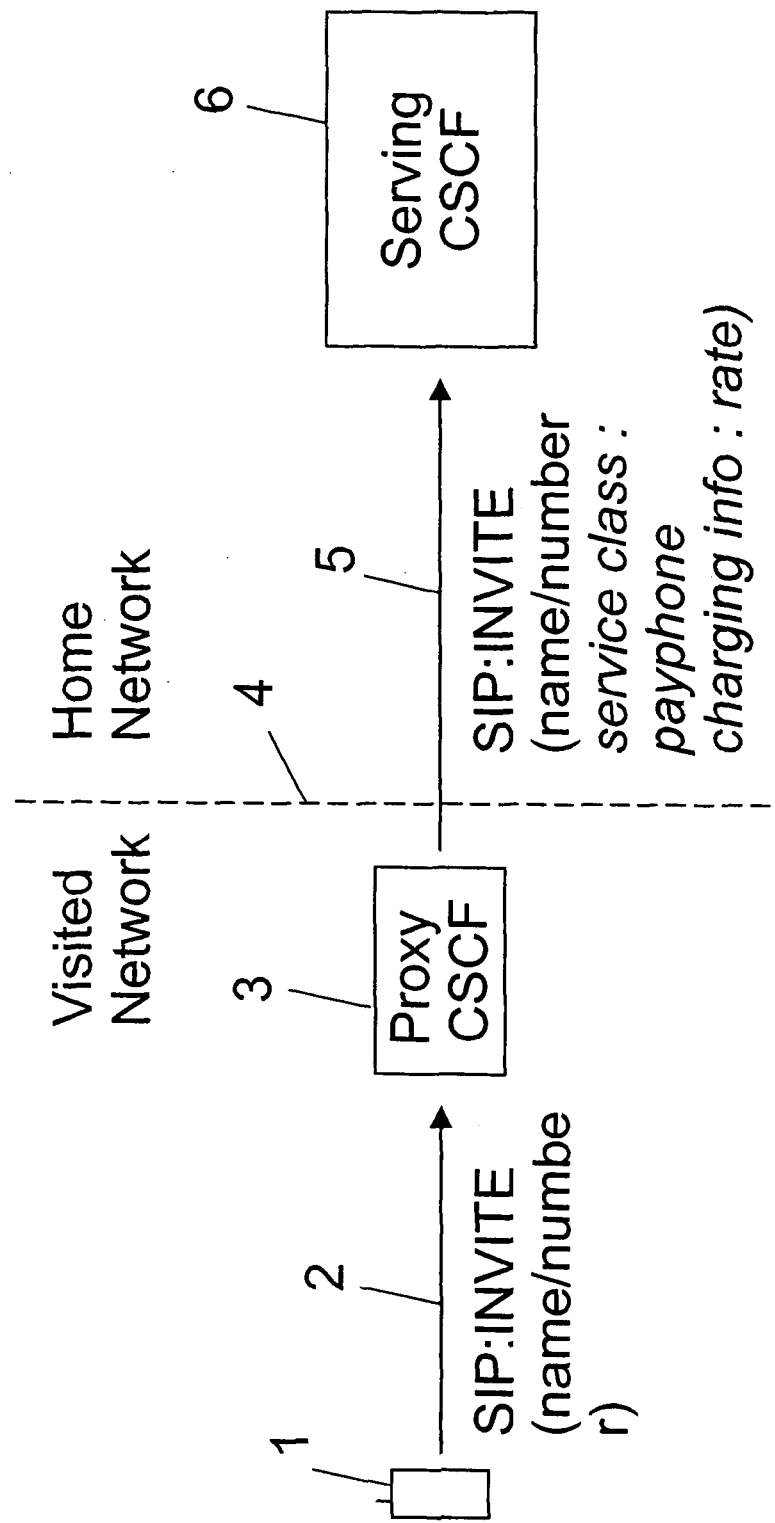
FIG. 1 illustrates a first embodiment of the invention which provides service information transfer from a visited network to a home network.

FIG. 1 shows an embodiment of the invention in a condition where a mobile network element 1 such as a mobile terminal, for example mobile phone, has roamed to another network ("visited network") from its home network in which it is registered as a subscriber. The visited network comprises a further network element 3 which is, in this embodiment, a control means or function such as a proxy CSCF (Call State Control Function). This function or the means 3 performing this function, as well as the other network elements are described in for example 3GPP's TR 23.821 v1.0.0. (accessible for instance via Internet www.3gpp.org). The borderline between the visited network and the home network is represented by a broken line 4. The home network comprises a serving CSCF 6 to which the subscriber of network element 1 is registered and where the call state control including for example charging is handled.

When the mobile network element 1 requests to be connected to another network element registered to the visited network, the network element 1 sends a message 2 to the proxy element 3 identifying the other network element for example by name or number or other identifier. This message preferably is a protocol message. In a preferred embodiment, the protocol message is a SIP (Session Initiation Protocol) word indicating name and/or number of the called party. The protocol word may be a SIP:INVITE message.

The proxy means 3 comprises, or has access to, a table which comprises additional information such as service class, for example payphone, charging information, for example charging rate, etc., mapped to the subscriber identification (for example name or number) of the subscribers of the visited network. In addition, the proxy means 3 contains or may have access to network or network element related information such as for example time zone, service capabilities of visited network or network elements and service interworking information for visited network and home network co-operation. When receiving message 2, the proxy means 3 looks up the additional information or parameters stored for the called party by using the identification (name or number) included in message 2, and sends a message 5 to the serving function or means 6 of the home network. In addition, information related to visited network or network elements may additionally or alternatively be included in message 5.

The message 5 may be a protocol word, preferably SIP:INVITE, which now includes, in addition to the name and/or number or other identifier identifying the party to which a connection is to be established, additional parameters or information necessary for appropriately handling or processing the connection from network element 1 to the called party. The name and/or number or other identifier included in message 5 may be the same information as the information contained in message 2, or may be derived therefrom or from other information. As an example, when for example a call repetition request is sent in message 2, this call repetition request may for example be translated into the name or other identifier of the party to which a connection is to be established, for example using a database which stores the last called numbers or the like.

In the present example, the additional information included in message 5 is "service class: payphone" and "charging info: rate". The serving means 6 therefore has sufficient information for properly controlling, handling or processing the call, including correctly charging the costs for the connection.

This structure ensures proper functioning of the network and alleviates control means 6 from the burden of fixedly storing information on all network elements of all other networks to which roaming of the own subscribers is allowed. Each network to be visited may have one or more of the proxy means 3 being able to add additional information to message 5 identifying or characterizing the party or equipment to which network element 1 wants to get connected or additional information related to the visited network or network elements in it.

The structure of the communication system shown in FIG. 1 thus enables the transfer of service information from the visited to the home network on a per-call-basis wherein the relevant parameters for the called party or the visited network are directly included in the message 5 sent from network element 3.

Figure 2:
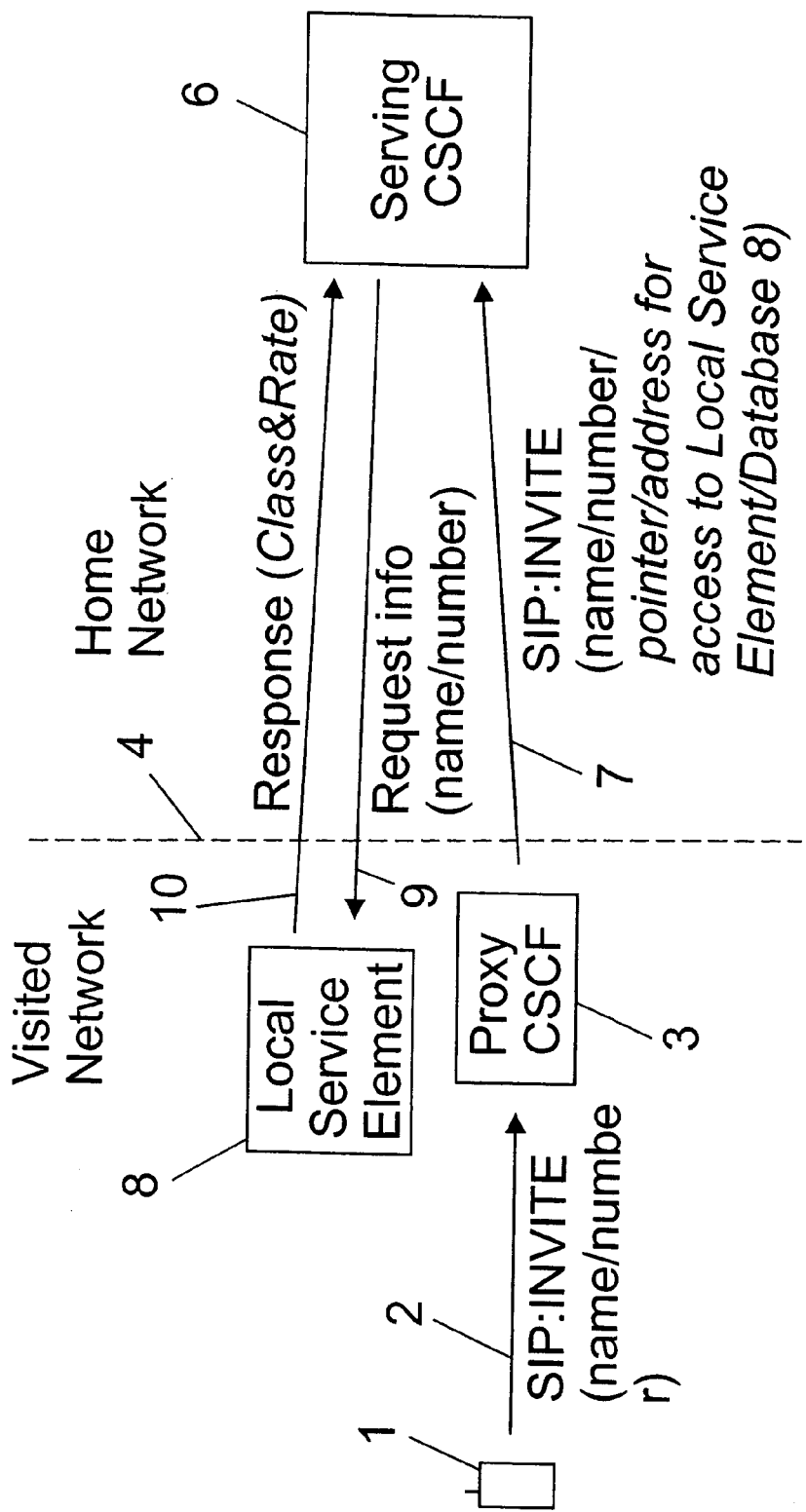
FIG. 2 shows a further embodiment of the invention in which the transfer of service information from the visited to the home network is performed on a call-basis by transmitting a pointer.

FIG. 2 shows a further embodiment of the invention in which the proxy means 3 stores a pointer pointing to a local service element 8 of the visited network. The local service element 8 is or comprises a database in which information and/or parameters for the subscribers of the visited networks are stored. This information or parameters preferably includes information such as service class (for example payphone, and charging rate, for example business tariff or private tariff. In addition, information related to the visited network or network elements may be stored in the database of service element 8. This information includes for example time zone, service capabilities of visited network or network elements and service interworking information for visited network and home network co-operation. Such a structure alleviates the proxy means 3 from storing or accessing an own database and thus reduces the storage and processing capacity requirements of the proxy means 3.

In the case of FIG. 2, when the network element 1, such as a mobile user phone, wants to get connected to another network element registered to the visited network such as a subscriber or host or the like, the network element 1 sends as first step, similar to the case of FIG. 1, a message 2 to the proxy means 3 which includes an identifier for identifying the called network element or party (name and/or number of the called entity). When receiving message 2, the proxy means 3 responds by sending a message 7 to the serving entity 6 of the home network of network element 1. Similar to the message 2, the message 7 is a protocol message preferably of the SIP protocol, such as a SIP:INVITE message. However, the proxy means 3 has included into message 7, in addition to the name/number of the called party, an identifier such as a pointer pointing to another network element of the visited network, preferably the local service element 8.

The proxy means 3 may alternatively or additionally add some other information that is associated to local service element 8 and the called number or the visited network or network elements. This parameter may be a 'key' that is used when Local Service Element is queried by means 6. This 'key' is used e.g. for security purposes. This 'key' is pointing to the actual information for the called number, the visited network and/or the visited network elements.

The pointer may be any information identifying the local service element 8 such as an address sufficient for addressing element 8. The local service element 8 contains a database in which the subscriber names or numbers of the subscribers of the visited network are mapped to the information or parameters necessary for properly handling or processing connections to the subscribers of the visited network. The local service element 8 may also store visited network specific or network element specific information accessed from the database using the 'key' mentioned above. After having received message 7, the serving means 6 sends a message 9 to the local service element 8 identified by the pointer contained in message 7. The message 9 is a request to the local service element 8 requesting the element 8 to send information on the party to be called or information related to the visited network or network elements. Message 9 may be a query used to determine charging. Message 9 includes the name and/or number of the party to be called for identifying it, and eventually also the above mentioned key. Local service element 8 looks up its database and responds to message 9 by returning message 10, in which information on the called party relevant for properly handling a connection to the called party is included, such as service class and charging rate. Message 10 may also include direct instructions for connection processing. The serving means 6 now has sufficient information for properly treating and processing, including charging, of the connection between network element 1 and the called entity.

In the case of FIG. 2, the transfer of service information from the visited network to the home network is performed in several steps, by first sending message 7 from the visited network to the home network, then returning message 9 from the home network to the visited network and accessing the database of local service element 8, and finally sending the call-related information from the visited network to the home network by message 10. Hence, the service information transfer from a visited to a home network is performed by passing a pointer on a per-call-basis, i.e. by each call involving a connection between a roaming subscriber of the home network and a subscriber of the visited network.

Figure 3:
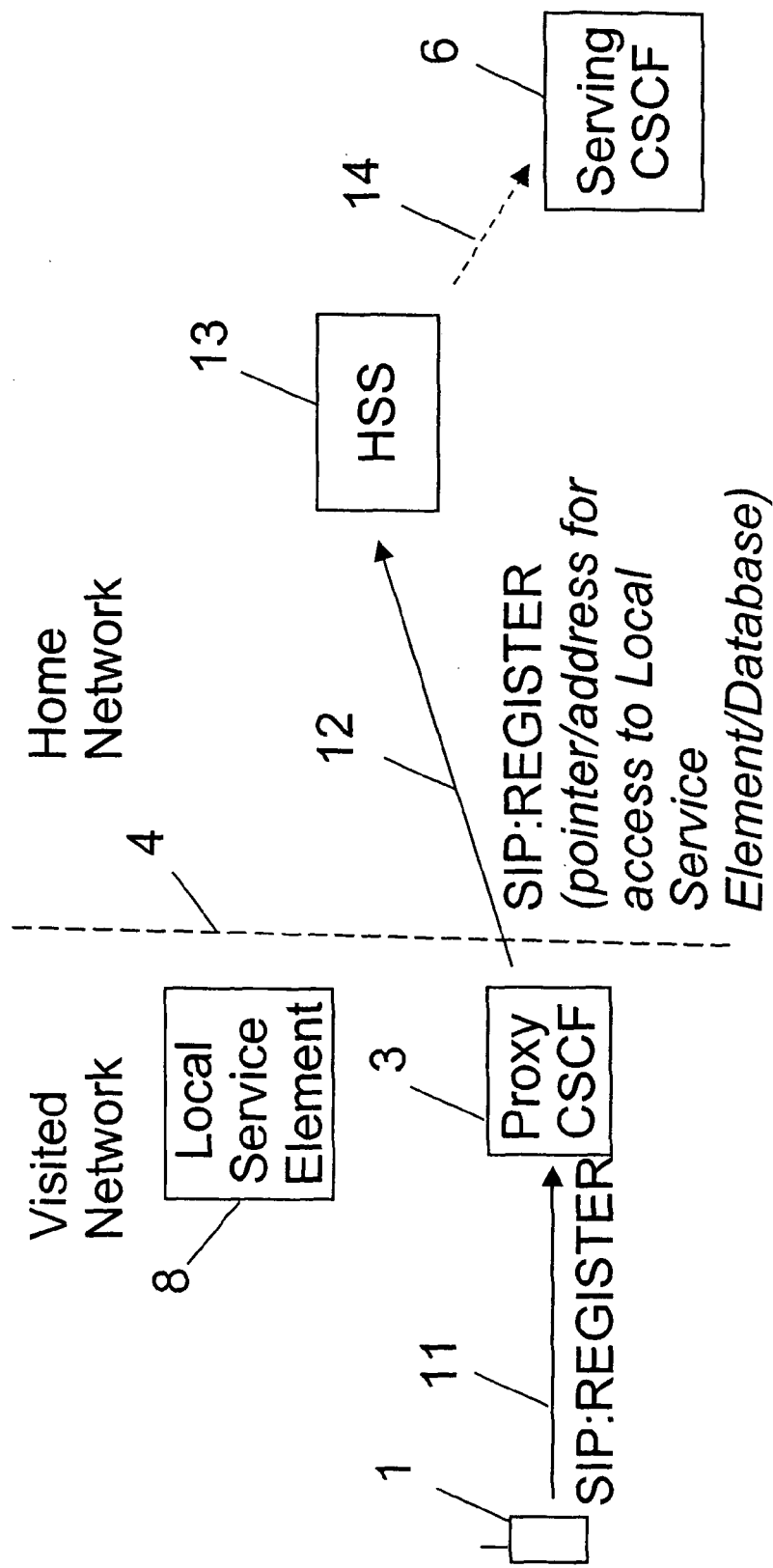
FIG. 3 shows another embodiment of the invention providing a transfer of service information from the visited to the home network in which a pointer is passed at the registration phase.

FIG. 3 shows a further embodiment in which, for service information transfer from a visited network to the home network, a pointer pointing to a local service element of a visited network is passed at the registration phase.

When a subscriber to the home network has roamed to the visited network and wants to use or activate his/her terminal network element 1, such as a mobile phone or laptop, for example by switching element 1 on, the network element generates a "register" request which is sent to the proxy server or function 3 of the visited network. This register request may be a message 11, SIP:REGISTER. The details of SIP are defined e.g. in RFC2543, which document inter alia explains the "INVITE" and "REGISTER" requests and the handling thereof. The disclosure contents of this document is included herein.

When the proxy means 3 receives the REGISTER request 11, the proxy means responds by sending a message 12 to the home network. The message 12 may likewise be a request "SIP:REGISTER". In message 12, in addition to the information identifying network element 1 to be registered, a pointer is added which points to a local service element or a database of the visited network such as element 8 of FIG. 2. This local service element or database contains information on the network entities or users subscribed to the visited network, the information including service class and charging information for properly building connections to the subscribers of the visited network, as already explained above with regard to FIGS. 1 and 2. The message 12 is addressed to a register of the home network registering such information for access to the local service element/database of the visited network. The pointer contained in message 12 may be the access address of the local service element or database such as element 8, or any other appropriate identifier. According to FIG. 3, the message 12 is directed to a network element of the home network of network element 1.

The element 13, to which message 12 is directed and in which the pointer or address for the local service element/database is stored, may be the home subscriber server (HSS) 13 of the home network, or any other register storing location information related to the subscribers including roaming subscribers to the home network. This register, such as the home subscriber server 13 stores, in its database, the basic subscriber data for the network element 1 registering to the visited network, and in relation thereto the pointer or address pointing to the local service element or database of the visited network containing the necessary connection-related information for properly handling calls to subscribers of the visited network. When, later on, the network element 1 requests to be connected to another network element of the visited network, it sends a message such as message 2 (FIG. 2) to the proxy means 3. The proxy means 3 sends a message similar to message 7 to the serving means 6 of the home network. In this case, however, the message 7 only includes name or number, but no additional pointer or address, contrary to messages 5 or 7 of FIG. 1 or 2. The serving means 6 inquires the home subscriber server 13 by identifying network element 1 and requesting the transmission of the pointer or address of local service element 8 stored in server 13 in a relation to network element 1. The server 13 transmits this information as represented by arrow 14 in FIG. 3, to the serving means 6. Thereupon, the serving means 6 sends message 9 to the local service element 8 as shown in FIG. 2, which local service element 8 responds by returning message 10 including the connection-related information such as service class and billing rate.

In an alternative embodiment (not shown in any figure), there may be provided a redirect server in the visited network instead of the proxy means 3. Such a redirect server is described in SIP specification. In this case, a pointer pointing to the S-CSCF 6 is stored at the registration phase. When actual call is setup, the terminal 1 sends an INVITE message to the redirect server, which then replies by returning the S-CSCF address to terminal 1. The terminal resends the INVITE message directly to S-CSCF 6. In such a case, the charging and other call handling procedure is correctly performed by S-CSCF 6, and it is not necessary to trust the terminal 1 to send charging information.

Although the invention has been described above by mainly referring to embodiments implemented according to Release 2000 Architecture, the invention may also be incorporated in network architectures of a different type, such as GPRS-based, UMTS-based, GSM-based networks, etc. Further, although the SIP Protocol is preferred, other protocols may also be used for transferring the messages such as call originating or registering messages. The scope of the invention is not limited to the above described preferred embodiments and also covers modifications, amendments, omissions and alterations of the above-described features.

The invention claimed is:

1. A system, comprising:
    a second network element of a first network;
    a third network element,
    wherein the second network element is operationally connectable to a mobile network element which mobile network element roams to a first visited network, and the second network element is capable of accessing the third network element,
    wherein the second network element is configured to receive a first message from the mobile network element used to register to the first network or to connect to the third network element or a network element of the first network,
    wherein the second network element is configured as a proxy call state control function, the second network element is further configured to send a second message to the third network element configured as a serving call state control function, the second message comprising a registration, the second message further comprising additional information related to the handling or processing of a connection from the mobile network element to the network element of the first network, or related to an address of, or identifier identifying, a further network element of the first network, wherein the third network element is configured to use the additional information for handling the connection or processing of at least one connection-related function, or to access the further network element, or to store the additional information and to provide the additional information upon request, and wherein the second network element is configured to store a pointer pointing to a local service element of the first network.

2. The system according to claim 1, wherein the second network element is a proxy server.

3. A method, comprising:

receiving, at a second network element, a first message from a first network element configured to register to a first network or to connect to a third network element of a second network or to connect to a fourth network element of the first network, wherein the first network element is attachable to the first network and connectable to a second network element of the first network, and the second network element is capable of accessing the third network element located in the second network; and sending, at the second network element configured as a proxy call state control function, a second message to the third network element configured as a serving call state control function, the second message further comprising additional information either related to the handling or processing of a connection from the first network element to the fourth network element, or related to an address or identifier identifying; a further network element, wherein the second network element is configured to store a pointer pointing to a local service element of the first network.

4. The method according to claim 3, wherein: the first message and the second message are each a session initiation protocol message.

5. The method according to claim 3, wherein: the first message is a registration message message.

6. The method according to claim 3, wherein: the first network element is a user equipment of a roaming user.

7. The method according to claim 3, wherein: the third network element is a controller of the second network.

8. The method according to claim 3, wherein: the first network is a network visited by a roaming user and the second network is the home network of the user.

9. The method according to claim 3, wherein: the additional information is charging-related information, and wherein the additional information is service-class related information.

10. The method according to claim 3, wherein: the additional information defines the available service capabilities of the visited network or network elements.

11. The method according to claim 3, wherein: the additional information is a time zone.

12. The method according to claim 3, wherein: the additional information is service interworking instructions of the visited network or network elements.

13. The method according to claim 3, wherein: the additional information is an address of or a pointer pointing to a control element of the first network which contains the additional information.

14. An apparatus, comprising:

a receiver configured to receive a first message from a further apparatus requesting registering to a network or getting connected to another apparatus or an additional apparatus; and a transmitter configured to send a second message to the another apparatus, the second message comprising a registration, the second message further comprising additional information either related to the handling or processing of a connection from the further apparatus to the additional apparatus, or related to an address of or identifier identifying another apparatus, wherein the apparatus is configured as a proxy call state control function, wherein the another apparatus is configured as a serving call state control function, the apparatus is further configured to store a pointer pointing to a local service element of the first network.

15. The apparatus according to claim 14, wherein: the apparatus is a proxy server.

16. The apparatus according to claim 14, wherein: the apparatus is a redirect server.

17. An apparatus, comprising:

a receiver configured to receive, from another apparatus in a local network, the other apparatus configured as a proxy call state control function, additional information either related to the handling or processing of a connection between the other apparatus in the local network, or related to an address of or identifier identifying a further apparatus, wherein the additional information is sent by the other apparatus when the other apparatus receives a registration message from a user element; and a controller configured to use this additional information to handle the connection or processing of one or more connection-related functions, to access a further apparatus in the local network, or to store the additional information and to provide the stored additional information upon request, wherein the additional information comprises information that is related to the local network or local network elements, and wherein the apparatus comprises a serving call state control function.

18. The apparatus, according to claim 17, wherein: the apparatus is a controller of a network.

19. The apparatus according to claim 18, wherein: the controller is a serving call state control function.

20. The apparatus according to claim 17, further comprising a register configured to store information on subscribers to the another apparatus.

21. A method, comprising:

receiving, at a third network element, a message from a second network element of a local network, the second network element configured as a proxy call state control function, the third network element comprising a serving call state control function, the message comprising a registration, the message further comprising additional information either related to the handling or processing of a connection from a first network element to a fourth network element, or related to an address of or identifier identifying a further network element, wherein the second network element of the local network is connectable to the first network element which first network element is attachable to the first network, and the second network element is capable of accessing the third network element located in a second network; and using this additional information, at the third network element to handle the connection or to process one or more connection-related functions, to access the fourth network element, or to store the additional information and to provide the stored additional information upon request, wherein the additional information comprises information that is related to the local network or local network elements.

22. The method according to claim 21, wherein:

the third network element requests, after receiving the additional information, the a control element to send information on a network element to which the first network element requests to get connected, the control element responding thereto by returning such information.

23. The method according to claim 21, wherein: the first message and the second message are each a session initiation protocol message.

24. The method according to claim 21, wherein: the third network element is a controller of the second network.

25. The method according to claim 24, wherein: the controller of the second network is a serving call state control function.

26. The method according to claim 21, wherein: the third network element comprises a register storing information on subscribers to the second network.

27. The method according to claim 26, wherein: the register is a home location register or a home subscriber server.

28. The method according to claim 21, wherein: the first network is a network visited by a roaming user and the second network is the home network of the user.

29. The method according to claim 21, wherein: the additional information is a charging-related information, and wherein the additional information is a service-class-related information.

30. The method according to claim 21, wherein: the additional information defines the available service capabilities of the visited network or network elements, and wherein the additional information is service interworking instructions of the visited network or network elements.

31. The method according to claim 21, wherein: the additional information is a time zone, or is an address of or a pointer pointing to a control element of the first network which contains the additional information.

32. The method according to claim 31, wherein:

the third network element requests, after receiving the additional information, the control element to send information on a network element to which the first network element requests to get connected, the control element responding thereto by returning such information.

33. An apparatus, comprising:

a receiver configured to receive a first message from a further apparatus requesting registering to a network or getting connected to another apparatus or an additional apparatus;

a transmitter configured to send a second message to a controller, the second message comprising a registration, the second message further comprising additional information either related to the handling or processing of a connection from the further apparatus to the additional apparatus, or related to an address of or identifier identifying another apparatus; and a controller, at a serving call state control function, configured to use this additional information to handle the connection or to process of one or more connection-related functions, to access a further apparatus, or to store the additional information and to provide the stored additional information upon request, wherein the apparatus is configured as a proxy call state control function, the apparatus is further configured to store a pointer pointing to a local service element of a network.

* * * * *